United States Patent
Ushirozawa

(10) Patent No.: US 6,704,290 B1
(45) Date of Patent: Mar. 9, 2004

(54) TRANSMISSION DEVICE AND TRANSMISSION METHOD

(75) Inventor: Mizuyuki Ushirozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/535,743

(22) Filed: Mar. 27, 2000

(30) Foreign Application Priority Data

Mar. 31, 1999 (JP) .......... 11-092371

(51) Int. Cl.[7] .......... G01R 13/08
(52) U.S. Cl. .......... 370/252; 375/225
(58) Field of Search .......... 370/252, 253; 379/32.01; 375/225; 359/189

(56) References Cited

U.S. PATENT DOCUMENTS

| | | | |
|---|---|---|---|
| 3,747,074 A | * 7/1973 | Schulze | 713/600 |
| 3,775,751 A | * 11/1973 | Anderson | 370/465 |
| 5,157,651 A | * 10/1992 | Ghelberg et al. | 370/233 |
| 5,179,549 A | * 1/1993 | Joos et al. | 370/232 |
| 6,104,697 A | * 8/2000 | Kwon | 370/232 |
| 6,314,097 B1 | * 11/2001 | Ohara | 370/392 |
| 6,498,670 B2 | * 12/2002 | Yamashita et al. | 398/209 |

FOREIGN PATENT DOCUMENTS

| | | |
|---|---|---|
| JP | 54-124611 | 9/1979 |
| JP | 62-66730 | 3/1987 |
| JP | 2-11049 | 1/1990 |
| JP | 5-102996 | 4/1993 |
| JP | 5-227251 | 9/1993 |
| JP | 9-245427 | 9/1997 |
| JP | 10-341469 | 12/1998 |

OTHER PUBLICATIONS

Japanese Office Action dated May 14, 2002, with partial translation.

* cited by examiner

Primary Examiner—Hassan Kizou
Assistant Examiner—D. Levitan
(74) Attorney, Agent, or Firm—McGinn & Gibb, PLLC

(57) ABSTRACT

A transmission device includes a change-point counter counting, for a predetermined time interval, a number af change points in code included in an input digital signal for outputting a count result. A transmission rate identification circuit determines a transmission rate of the input digital signal based on the count result. The input digital signal includes an STM-N (Synchronous Transfer Mode: N is a positive integer) signal. The time interval is a value in a range from a time equivalent to three bytes of STM-4 to a time equivalent to N×10 bytes.

9 Claims, 10 Drawing Sheets

TRANSMISSION DEVICE AND TRANSMISSION METHOD

BACKGROUND OF THE INVENTION

1. Field of the Invention

The present invention relates to a transmission device and a transmission method used in digital communication, and more particularly to a transmission device and a transmission method capable of detecting the transmission rate of a received digital signal.

2. Description of the Related Art

In a conventional communication system, a signal at a predetermined transmission rate is usually transmitted through each transmission line. However, as a photonic network to which wavelength division multiplexing (WDM) transmission is applied and in which optical crossconnects and optical add/drop multiplexers (ADM) are used has been in use in recent years, a plurality of optical signals have become transmitted through WDM technology. In this case, it is more likely that a plurality of optical signals, each at its own transmission rate, travel in the same transmission line. In such a network, when receiving each optical signal demultiplexed from the wavelength-multiplexed signals via the ADM and so on, the transmission rate of the signal must be identified.

As an example of a circuit identifying the transmission rate, a serial-data transmission rate detection circuit is disclosed in Japanese Patent Laid-Open Publication No. Hei 2-11049. This circuit counts the number of sampling clock pulses at least two times higher than the maximum rate of the expected transmission data for the duration equivalent to one bit of received serial data. The circuit detects the length of one-bit interval based on the count result and detects the rate of the transmission data. The circuit in the prior art described above requires a circuit operating at least two times the data transmission rate.

Recently, the Synchronous Transfer Mode (STM)-N is becoming the worldwide standard for the trunk line optical transmission system. The transmission rate of STM-N is based on 155.52 Mb/s that is the transmission rate of STM-1. A bit rate higher than STM-1 is set to an N multiples of 155.52 Mb/s (where, N is an integer). Out of these rates, the Consultative Committee on International Telegraphy and Telephony (CCITT), a permanent group of the International Telecommunication Union (ITU), recommends two rates as the standards: 622.08 Mb/s corresponding to N=4 and 2488.32 Mb/s corresponding to N=16. When N=64, the transmission rate is 9953.28 Mb/s. In an actual transmission system, these transfer modes are sometimes mixed. In such a case, the receiving side must check the mode in which data is transmitted in order to process received signals according to each transmission mode. However, the prior art described above requires a circuit operating twice as high as the data transmission rate. In STM-64, the circuit operation speed is as high as 20 Gb/s or higher. Such a high-speed circuit requires sophisticated manufacturing technology, resulting in increased costs.

SUMMARY OF THE INVENTION

It is an object of the present invention to provide a transmission device and a transmission method that are simple in circuit configuration and are capable of detecting the transmission rate without having to perform complex operations such as maintaining synchronization with input digital signals.

According to one aspect of the present invention, there is provided a transmission device comprising a change-point counter counting, for a predetermined time interval, a number of change points in code included in an input digital signal for outputting a count result; and a transmission rate identification circuit determining a transmission rate of the input digital signal based on the count result.

According to another aspect of the present invention, there is provided a transmission device comprising a plurality of frequency dividers each receiving an input digital signal and each having an frequency division ratio; a plurality of change-point counters each counting, for a predetermined time interval, a number of change points in code included in each of outputs of the plurality of frequency dividers for outputting a count result; and a transmission rate identification circuit determining a transmission rate of the input digital signal based on the count result.

According to still another aspect of the present invention, there is provided a transmission method comprising the steps of counting, for a predetermined time interval, a number of change points in code included in an input digital signal for outputting a count result; and identifying a transmission rate of the input digital signal based on the count result.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Some embodiments of the present invention will be described in detail by referring to the attached drawings.

First Eembodiment (1) Configuration of the Embodiment

Figure 1:
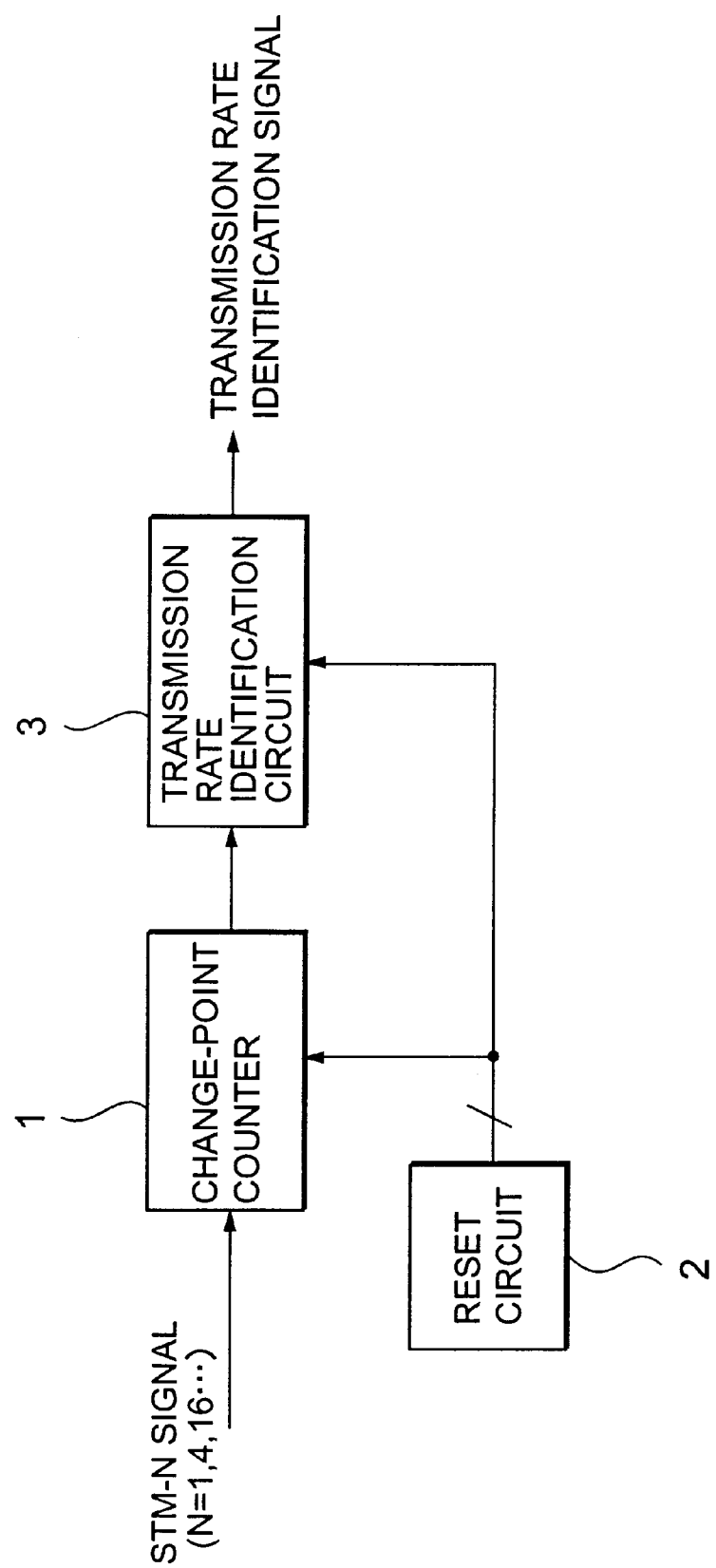
FIG. 1 is a block diagram showing a transmission rate detection circuit in a first embodiment of the present invention.
Figure 2:
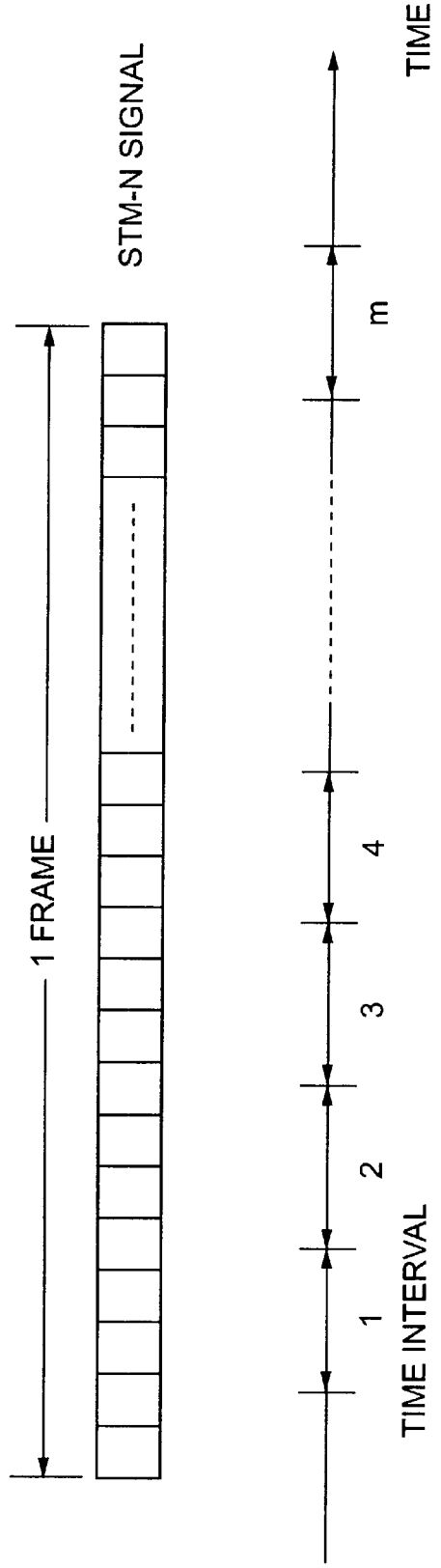
FIG. 2 is a diagram showing the relation between the STM-N signal and a time interval.

FIG. 1 is a block diagram showing a transmission rate detection circuit in a first embodiment of the present invention. The transmission rate detection circuit shown in FIG. 1 comprises a change-point counter 1, a reset circuit 2, and a transmission rate identification circuit 3. The STM-N signals sent to this circuit include STM-N signals where N=1, 4, 16, and 64. In this embodiment, the receiving side sets an appropriate time interval. During each time interval, the circuit counts the number of change-points (for example, a rise from 0 to 1) included in the STM-N signal that has arrived. FIG. 2 shows the relation between the STM-N signal and time intervals.

Figure 3:
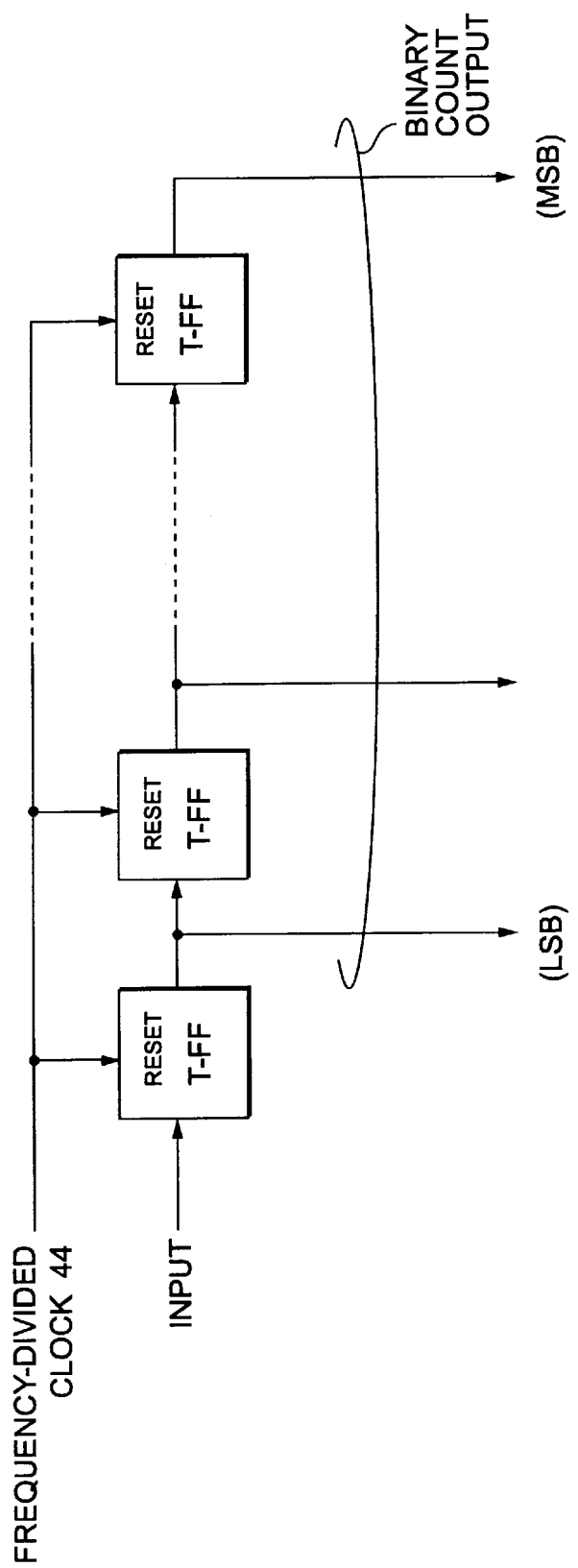
FIG. 3 is a diagram showing the configuration of a change-point counter.

The change-point counter 1 shown in FIG. 1 counts the number of change-points of the STM-N (N=1, 4, 16, 64) signal and outputs the result to the transmission rate identification circuit 3. The change-point counter 1 may be a binary counter which is known. The binary counter may be configured in one of several ways. For example, a predetermined number of serially connected T flip-flops each functioning as a binary frequency divider, such as the one shown in FIG. 3, may be used. In this case, the output of each T flip-flop represents the value of each place of the binary value of the count.

Figure 4:
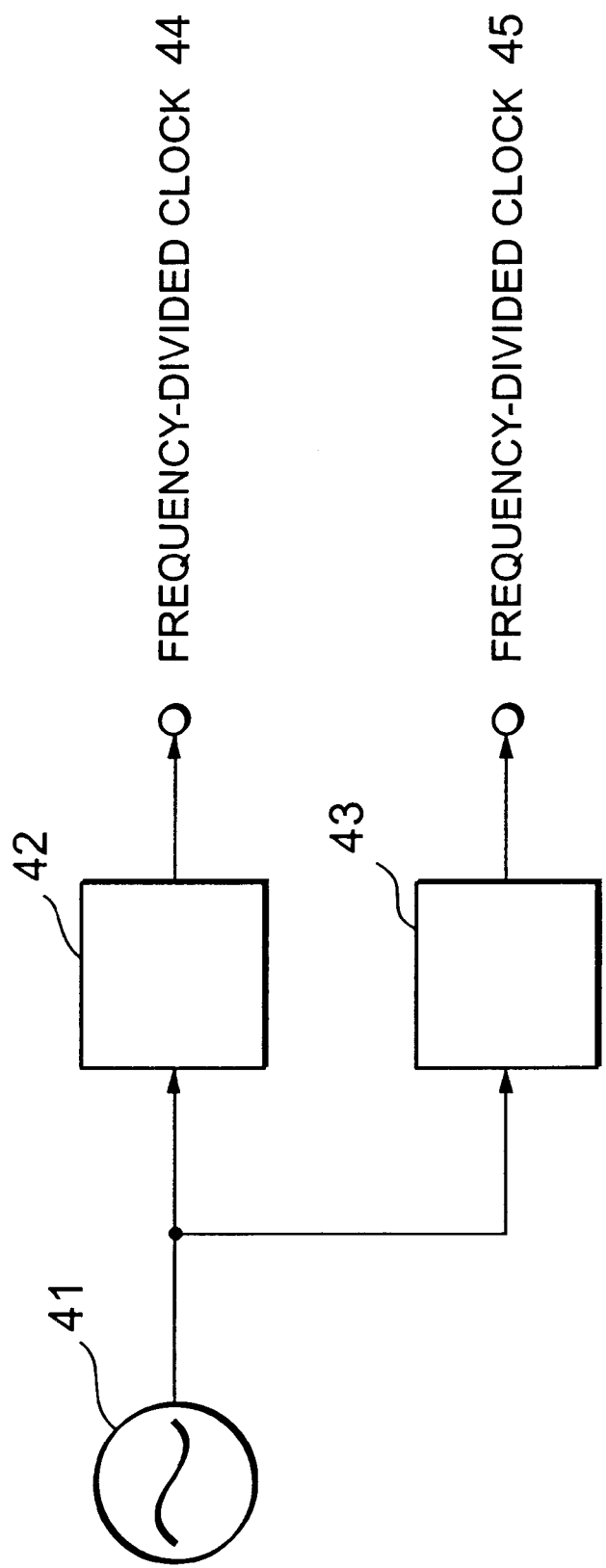
FIG. 4 is a diagram showing the configuration of a reset circuit.

The reset circuit 2 outputs the signal for resetting the change-point counter 1 to the change-point counter 1. The reset circuit 2 also outputs the signal for capturing the count of change-points output by the change-point counter 1 to the transmission rate identification circuit 3. FIG. 4 shows the configuration of the reset circuit 2. The reset circuit 2 comprises an oscillator 41 and frequency dividers 42 and 43. The oscillator 41 outputs the clock signal with the frequency equal to the transmission rate of STM-4, STM-16, or STM-64. The frequency divider 42 divides the output of the oscillator 41 into the signal with a period of a predetermined time interval (frequency-divided clock signal 44). The frequency divider 43 divides the output of the oscillator 41 into the signal with a period of the time length (125 µs) of one STM-N frame (frequency-divided clock signal 45).

The transmission rate identification circuit 3 holds the maximum count of change-points read from the change-point counter 1 for the duration of at least 125 µs that corresponds to one frame periodof STM-N (N=1, 4, 16, 64). From that value, the circuit identifies the transmission rate of the STM-N (N=1, 4, 16, 64) signal.

Figure 5:
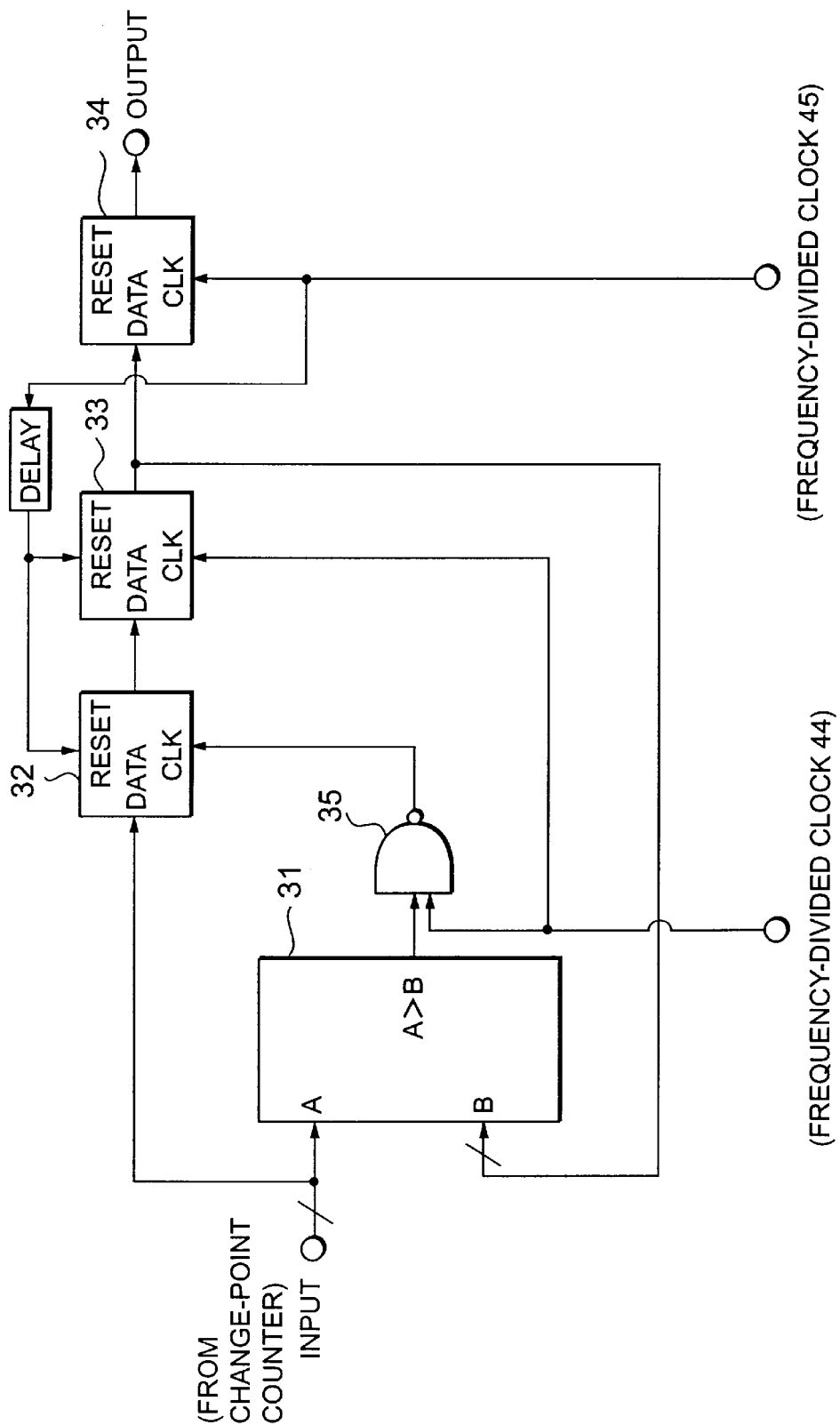
FIG. 5 is a diagram showing the configuration of a transmission rate identification circuit.
Figure 6:
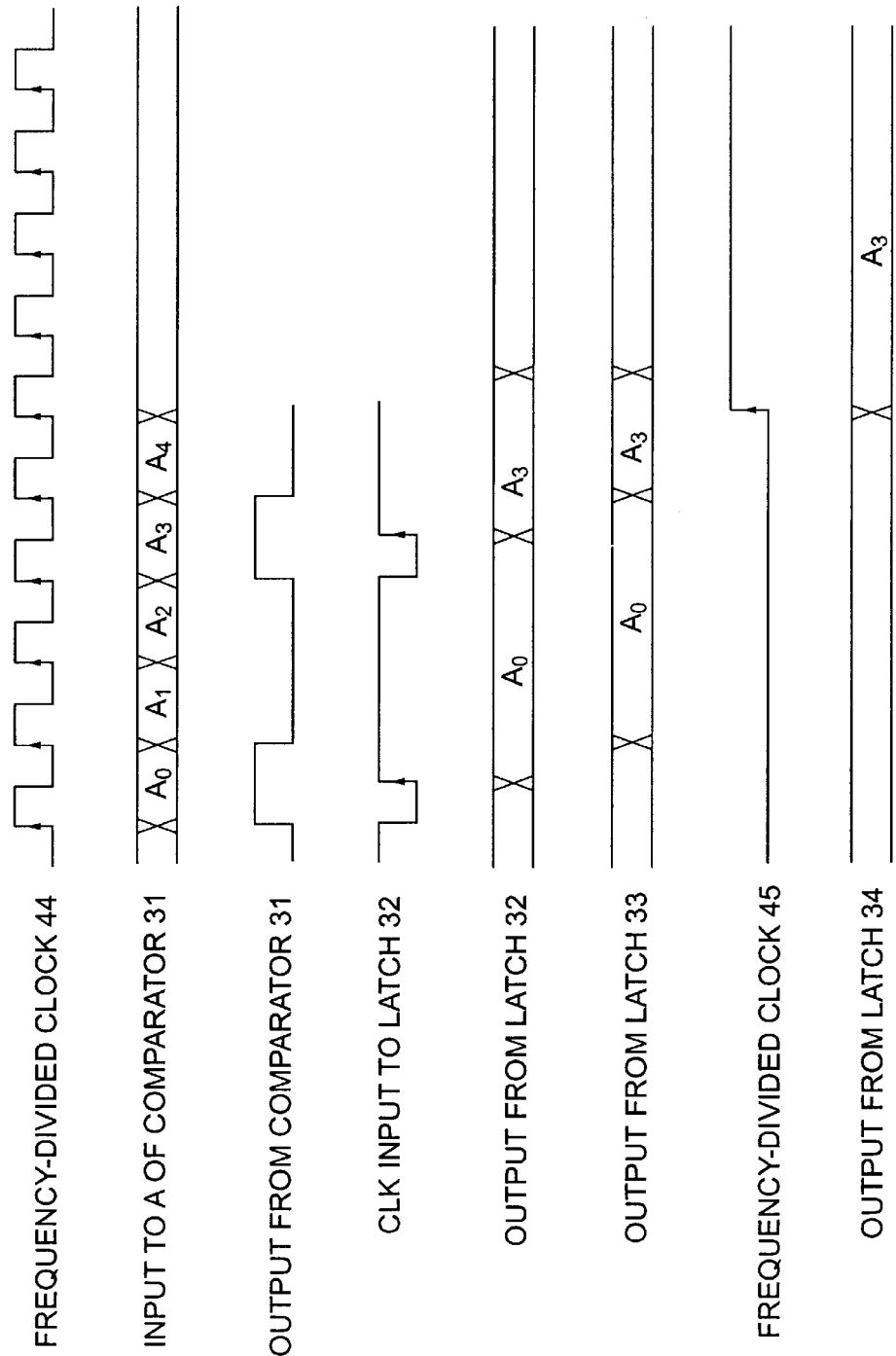
FIG. 6 is a diagram illustrating the operation of the transmission rate identification circuit.

FIG. 5 shows the configuration of the transmission rate identification circuit 3. The transmission rate identification circuit 3 comprises a magnitude comparator 31, latches 32, 33, and 34, and an NAND gate 35. The binary count value output from the change-point counter 1 is entered into one input terminal (A) of the magnitude comparator 31. The other input terminal (B) of the magnitude comparator 31 receives the count value of the preceding time interval. The magnitude comparator 31 compares the magnitudes of these two input signals. When the magnitude of the input signal at terminal A is larger, the magnitude comparator outputs "1" from the output terminal; otherwise, the magnitude comparator outputs "0" from the output terminal. The output of the magnitude comparator 31 and the frequency-divided clock signal 44 are input to the NAND gate 35. The output of the NAND gate 35 is input to the latch 32 as a clock signal. The latch 32 latches the output of the change-point counter 1 on the falling edge of the clock signal that is received. The latch 33 in the next stage latches the output of the latch 32 on the rising edge of the frequency-divided clock signal 44. The latch 34 latches the output of the latch 33 on the rising edge of the frequency-divided clock signal 45. FIG. 6 is the timing chart showing the operation of the transmission rate identification circuit 3. When the count value entered into input terminal A of the magnitude comparator 31 satisfies the condition A>B, the magnitude comparator 31 outputs "1". At this time, the NAND gate 35 opens and the frequency-divided clock signal 44 is applied to the latch 32 via the NAND gate 35. The output of the latch 33 is latched by the latch 34 on the next rising edge of the frequency-divided clock signal. The output of the latch 34 is supplied to input terminal B of the magnitude comparator for comparison with the count value entered into input terminal A of the magnitude comparator 31 in the next period of the frequency-divided clock signal. The outputs of the latches 32 and 33 are updated to a new count value whenever a larger count value arrives at the input terminal A of the magnitude comparator 31. Therefore, the count value at the end of one frame is the maximum count value of the frame. This maximum value is held in the latch 34 during the period of the next frame.

(2) Operation of the Embodiment

Figure 7:
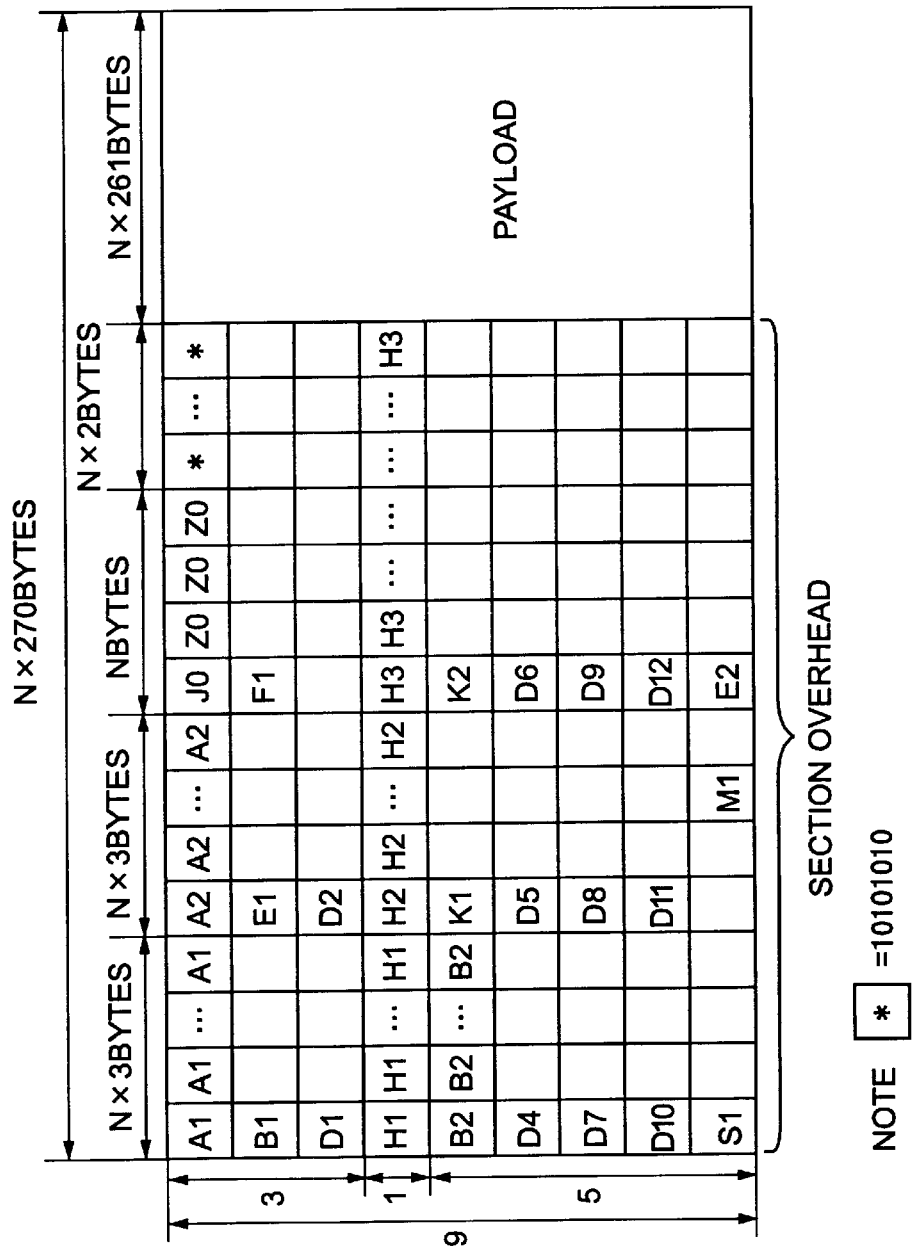
FIG. 7 is a diagram showing the frame configuration of the STM-N signal.

The STM-N (N=1, 4, 16, 64) signal has the most change-points when its pattern is a repetition of "1010 . . . ". FIG. 7 shows the frame structure of the STM-N signal. The frame structure shown in FIG. 7 is standardized, with one frame composed of N×270 bytes. The section overhead corresponds to a header including the synchronous signal, destination address, source address, and so on. Each frame has a payload, N×261 bytes in size, where transmission data is stored.

The first row of the section overhead, composed of A1, A2, J0, and Z0 bytes and the next N×2 bytes, is not scrambled during transmission. A1 (N×3 bytes) and A2 (N×3 bytes) are a fixed pattern for maintaining frame synchronization. The A1 bytes have a pattern 11110110, and the A2 bytes have a pattern 00101000. The J0 and Z0 bytes are signals for tracing the relay section and so on. The next N×2 bytes are not used as data. In general, a pattern "1010 . . . " is inserted into the N×2 bytes. Because the first row of the section overhead is not scrambled, the A1, A2, J0, and Z0 bytes and the next N×2 bytes which are a pattern "1010 . . . " are repeated every 125 µs which is the frame period of the STM-N signal.

The transmission rate detection circuit according to the present invention divides the STM-N (N=1, 4, 16, 64) signal into time intervals. Each interval ranges from 3/622.08 Mb/s=4.82 ns corresponding to the three bits of STM-4 to 514 ns corresponding to N×10 bytes of the STM-N signal. The circuit counts the number of change-points of the STM-N signal during each time interval to detect the maximum of change-points in one frame of the STM-N signal. The circuit identifies the transmission rate by taking advantage of the fact that the maximum count value depends on the transmission rate.

When the time interval is set to a time equivalent to three bits of STM-4, the N×2 bytes correspond to more than 20 times of one time interval. This means that the pattern "1010 . . . " is detected in at least one time interval of a frame regardless of the start of the time interval. Therefore, the maximum change-point count is constant in this case regardless of the start of the time interval. That is, the maximum change-point count value is 1 for STM-1, 2 for STM-4, and N/2 (where N>4) for STM-N. More specifically, the maximum change-point count value is 0 or 1 for STM-1, 2 for STM-4, 6 for STM-16, and 24 for STM-64. Therefore, the transmission rate of the STM-N (N=1, 4, 16, . . . ) signal may be identified by setting the identification threshold of STM-1 and STM-4 to 2 and by setting the identification threshold of STM-n and STM-4n (n=4, 16, . . . ) to a value between n/2 and 2n.

Until the time interval reaches N bytes, at least one time interval is filled with the "1010 . . . " pattern in one frame as for the time interval of the three bits of the STM-4 signal.

When the time interval is N×10 bytes, the maximum of the count value in one frame depends on a part other than the A1 bytes, A2 bytes, and N×2 bytes composed of a fixed pattern of 1010. The count value of one frame becomes the maximum when this part is filled with a fixed pattern of 1010. In this case, the maximum of the count value is obtained when one time interval is filled with the pattern of 1010. The maximum is N×10×8÷2=N×40. More specifically, the maximum value is 40 for STM-1, 160 for STM-4, 640 for STM-16, and 2560 for STM-64. The maximum of the count value in one frame becomes the minimum when this part is filled with a pattern of the same consecutive code. In this case, the maximum of the count value becomes the minimum when the A1 bytes, A2 bytes, and N×2 bytes of a fixed pattern of 1010 are divided equally into two consecutive time intervals. At this time, the count value in the two time intervals becomes the maximum in one frame, and the count values of all other time intervals become zero. The maximum of the count value at this time is N×10. More specifically, the maximum count value is 10 for STM-1, 40 for STM-4, 160 for STM-16, and 640 for STM-64. From the above description, the range of the maximum value of the number of change-points when the start of the time interval is changed is 10–40 for STM-1, 40–160 for STM-4, 160–640 for STM-16, and 640–2560 for STM-64. Therefore, the range of the maximum count value in one frame of STM-n and STM-4n (n=1, 4, . . . ) is n×10–n×40 and n×40–n×160, respectively. Thus, setting the threshold of the transmission rate to n×40 enables the transmission rate to be identified.

When the time interval is N×10 bytes, the upper bound and the lower bound of the maximum value ranges of two consecutive STM-N (N=1, 4, 16, 64) signals match. Therefore, using a time interval smaller than this time interval (N×10 bytes) generates a gap between the upper bound and the lower bound of the maximums of two consecutive STM-N signals. A value included in the range of this gap, when used as the threshold for identifying the count value, enables the receiving side to identify which STM-N signal is being received.

As shown in FIG. 1, the change-point counter 1, which counts the number of change points in the entered STM-N (N=1, 4, 16, 64) signal, is reset by the reset signal from the reset circuit 2. The interval of the reset signal, when set to a time ranging from 514 ns (corresponding to N×10 bytes of the STM-N signal) to 4.82 ns (corresponding to three bits of the STM-4 signal), generates a unique maximum number of signal change-points of one-frame for each of the signals STM-1, STM-4, . . . , STM-N. This difference makes it possible to identify the transmission rate.

When the time interval is set to a value close to 514 ns, the maximum of change-points of STM-n (n=1, 4, . . . ), which is counted by the change-point counter 1, becomes very close to the minimum of the maximum of STM-4n. For this reason, when the received signal includes an error, the transmission rate may be identified incorrectly. On the other hand, when the time interval is set to a value close to 4.82 ns, the maximum count value of STM-1 becomes very close to that of STM-4. In addition, the reset signal is asynchronous to the input signal. Thus, when the reset signal is not well timed, it is likely that STM-1 and STM-4 cannot be identified correctly.

Therefore, it is desirable that the period of the reset signal be set to the maximum interval that includes only a part of the last N×2 bytes, composed of a pattern of 1010 . . . (a pattern generating maximum change points in the transmission rate), in the first row of the section overhead of the STM-N (N=1, 4, 16, . . . ) signal. That is, the period should be set to 51.44 ns that is a time interval in which N bytes of the STM-N signal are included. When the period of the reset signal is set to 51.44 ns, the maximum of the number of change points in one frame of the STM-N signal, which is counted by the change-point counter 1, is 4 for STM-1, 16 for STM-4, and 4N for STM-N. Therefore, by setting the detection threshold of STM-n and STM-4n (n–1, 4, . . . ) to 8n, the transmission rate of STM-N may be identified. In addition, the difference between the maximum count value (4n) in one frame of STM-n and the identification threshold (8n) and between the identification threshold (8n) and the maximum count value (16n) in one frame for STM-4n are large (twice as large for each). This ensures reliable operation even when the reset signal is slightly out of synchronization or the signal includes an error.

When the period of the reset signal generated by the reset circuit 2 is set to 51.44 nsec and the change-point counter 1 that receives the STM-N signal gives the count value of 4, 16, or 64, the transmission rate identification circuit 3 identifies that the signal is STM-1, STM-4, or STM-16, respectively. The output of the transmission rate identification circuit 3 is used for signal processing based on the transmission rate, for example, for transmission rate conversion. Thus, data signal processing is performed using data containing no transmission error.

Second Embodiment

Figure 8:
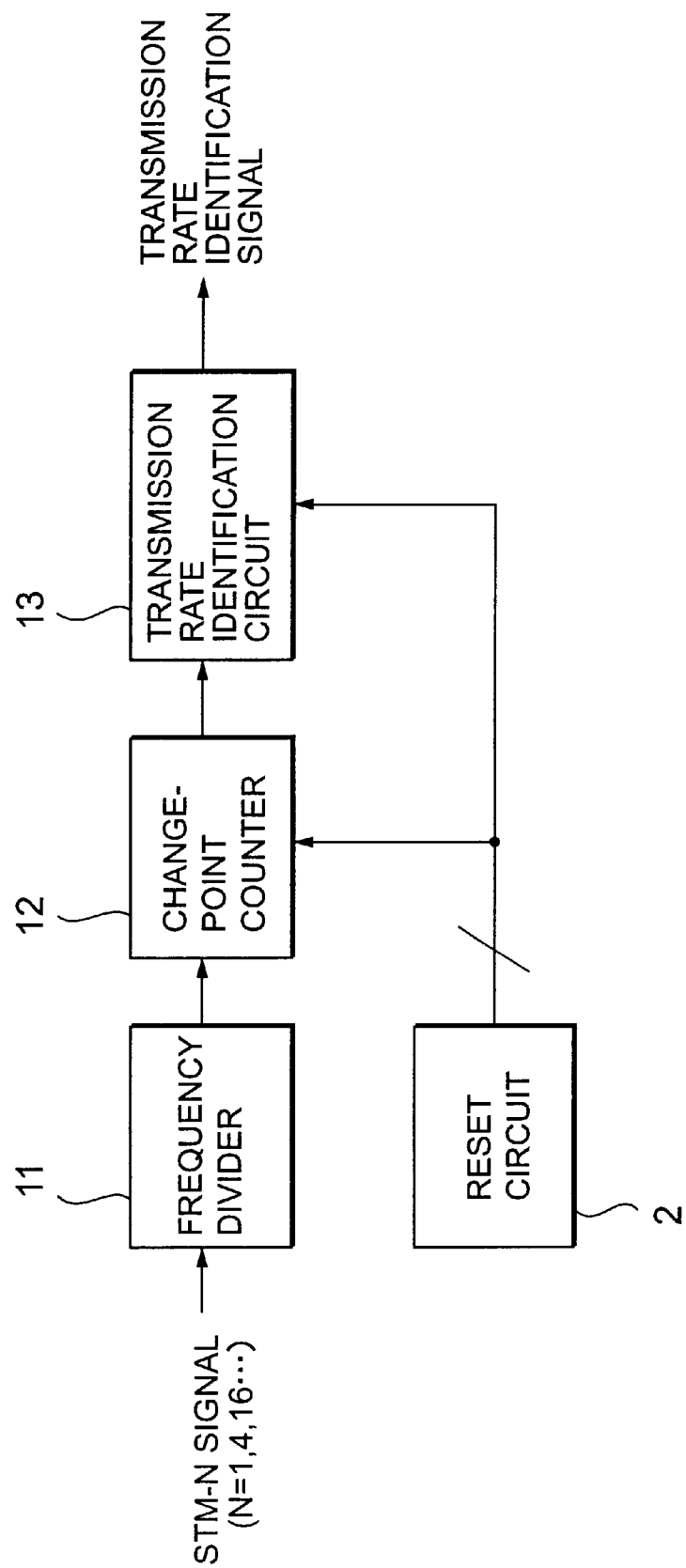
FIG. 8 is a block diagram showing a transmission rate detection circuit in a second embodiment of the present invention.

Referring to FIG. 8, a second embodiment of the present invention will be descried. A transmission rate detection circuit in this embodiment comprises a frequency divider 11, a change-point counter 12, a transmission rate identification circuit 13, and the reset circuit 2.

The frequency divider 11 receives the STM-N signal and divides its frequency using a predetermined frequency division ratio. The change-point counter 12 counts the number of change points that appear in the reset interval of the output of the frequency divider 11. The transmission rate identification circuit 13 identifies the transmission rate based on the count value supplied from the change-point counter 12. The reset circuit 2 outputs the reset signal to the change-point counter 12 and the transmission rate identification circuit 13 corresponding to the STM-N signal.

In the first embodiment, the counter counts the number of change points in the received STM-N signal. In such a configuration, a high transmission rate signal requires a high-speed counter (For example, the STM-64 signal, with the transmission rate of 9953.28 Mb/s requires a counter that operates at least 5 GHz). Such a counter is difficult to implement. Therefore, in this embodiment, the received STM-N signal is frequency-divided before the change points are counted. Because the frequency division ratio, if too high, makes it difficult to distinguish between STM-1 and STM-4, it is desirable that the frequency division ratio of the frequency divider 11 be 8 or smaller.

For example, when the period of the reset signal is 51.44 nsec and the frequency division ratio of the frequency divider 11 is 4, the value of the change-point counter 12 for STM-1, STM-4, and STM-16 are 1, 4, and 16, respectively.

Third Embodiment

Figure 9:
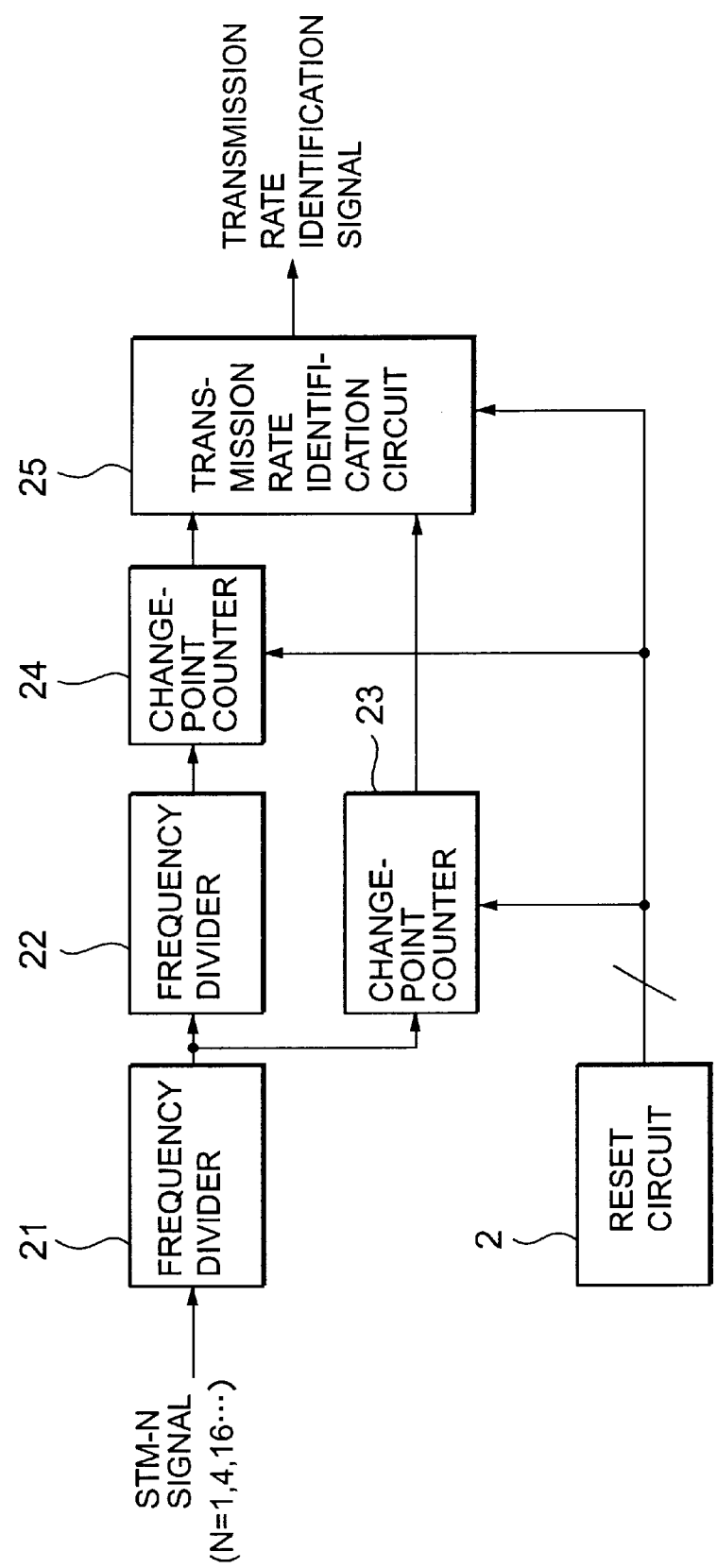
FIG. 9 is a block diagram showing a transmission rate detection circuit in a third embodiment of the present invention.

FIG. 9 is a block diagram of a third embodiment of the present invention. A transmission rate detection circuit in this embodiment comprises a frequency divider 21, a change-point counter 23, a frequency divider 22, a change-point counter 24, a transmission rate identification circuit 25, and the reset circuit 2.

The frequency divider 21 divides frequency of the received STM-N signal. The change-point counter 23 counts the number of change points included in the output of frequency divider 21 for the reset interval. The frequency divider 22 further divides the frequency of the output of the frequency divider 21. The change-point counter 24 counts the number of change points included in the output of the frequency divider 22 for the reset interval. The transmission rate identification circuit 25 identifies the transmission rate in response to the counter value of the change-point counter 23 and the counter value of the change-point counter 24. The reset circuit 2 outputs the reset signal to the change-point counters 23 and 24 and the transmission rate identification circuit 25 when the STM-N signal is received.

This embodiment differs from the second embodiment in that the transmission rate is identified using aplurality (two frequency dividers in this example) of frequency dividers 21 and 22. In the description of the operation of this embodiment given below, assume that the frequency division ratio of the first frequency divider 21 is ⅛ and that the frequency division ratio of the second frequency divider 22 is ¼. Also assume that the period of the reset signal is 51.44 nsec.

(1) When the Received Signal is STM-1:

The maximum value of the first change-point counter circuit 23 in one frame is 1, and the maximum value of the second change-point counter circuit 24 is 0 or 1.

(2) When the Received Signal is STM-4:

The maximum value of the first change-point counter circuit 23 in one frame is 4, and the maximum value of the second change-point counter circuit 24 is 1.

(3) When the Received Signal is STM-16:

The maximum value of the first change-point counter circuit 23 in one frame is 16, and the maximum value of the second change-point counter circuit 24 is 4.

(4) When the Received Signal is STM-64:

The maximum value of the first change-point counter circuit 23 in one frame is 64, and the maximum value of the second change-point counter circuit 24 is 16.

Therefore, STM-1 and STM-4, -16, and -64 may be identified using the maximum value of the first change-point counter 23. STM-4 and STM-16 and -64, and STM-16 and STM-64, may be identified using the maximum value of the second change-point counter 24. In this case, the operation speed of the first frequency divider 21 is about 5 GHz, the operation speed of the second frequency divider 22 is about 1.3 GHz, and the operation speed of the counter circuits (first change-point counter 23 and second change-point counter 24) is about 200 MHz. Compared with the second embodiment, lower-speed counter circuits may be used. This increases the accuracy of the count value and the identification result of the transmission rate identification circuit 25.

Figure 10:
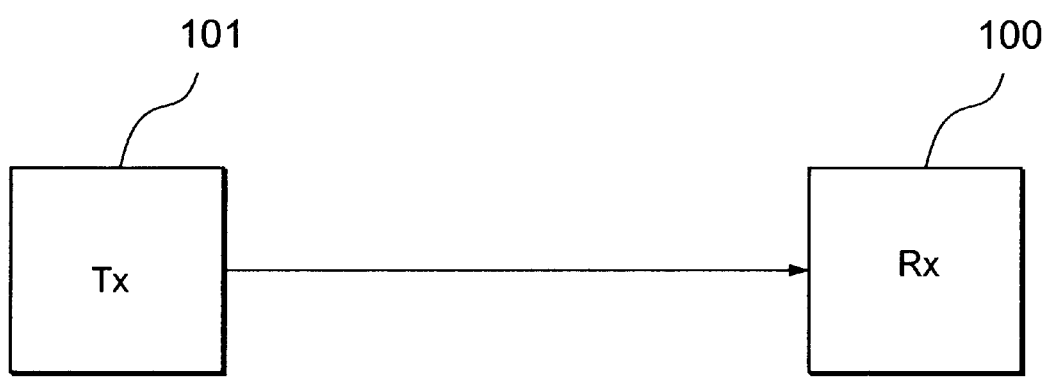
FIG. 10 is a diagram showing the configuration of a transmission system using the transmission rate identification circuit.

FIG. 10 is an example of a transmission system in which the transmission rate detection circuit used in the above embodiment is a receiver 100 to which a transmitter 101 is connected.

In the above embodiments, the transmission rate of the STM-N mode is checked and detected. The present invention may be applied not only to the STM-N mode but also to other similar transmission modes. For example, when two or three bytes, composed of a pattern of 010101, are always included in transmission data coded in the CMI mode or the run-length mode described above, the transmission rate may be detected. In the above embodiments, only the number of change points from the low level to the high level is counted. Instead of this, the change points from the high level to the low level may be counted. In addition, both the change points from the high level to the low level and the change points from the low level to the high level may be counted.

As described above, the transmission rate detection circuit according to the present invention counts the number of change points in the code included in the received digital signal for a time interval set up by the receiving side and, based on the result, identifies the transmission rate. Thus, the circuit according to the present invention, with a simple circuit configuration which eliminates the need for maintaining synchronization with the input signal, is able to detect the transmission rate.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. The transmission device comprising:

a change-point counter counting for a predetermined time interval, a number of change points in code included in an input digital signal for outputting a count result; and a transmission rate identification circuit determining a transmission rate of said input digital signal based on said count result, and wherein said input digital signal comprises an STM-N (Synchronous Transfer Mode; N is a positive integer) signal and wherein said time interval is a value in a range from a time equivalent to three bytes of STM-4 to a time equivalent to N×10 bytes.

2. The transmission device according to claim 1, further comprising a transmission circuit supplying said input digital signal to said change-point counter.

3. A transmission device comprising:

plurality of frequency dividers each receiving an input digital signal and each having its own frequency division ratio;

a plurality of change-point counters each counting, for a predetermined time interval, a number of change points in code included in each of outputs of said plurality of frequency dividers for outputting a count result; and a transmission rate identification circuit determining a transmission rate of said input digital signal based on said count result.

4. The transmission device according to claim 3, wherein said transmission rate identification circuit compares said count result with at least one of predetermined values to determine said transmission rate.

5. The transmission device according to claim 3, wherein said transmission rate identification circuit compares a maximum of said count results of a plurlity of said time intervals with at least one of predetermined values to determine said transmission rate.

6. The transmission device according to claim 3, wherein said input digital signal comprises an STM-N (N is a positive integer) signal and wherein said time interval is a value in a range from a time equivalent to three bytes of STM-4 to a time equivalent to N×10 bytes.

7. The transmission device according to claim 3, further comprising transmission ciwuits supplying said input digital signal to said change-point counters.

8. A transmission device comprising:

a change point counter counting, for a predetermined time interval, a number of change points in code included in an input digital signal for outputting a count result;

a transmission rate identification circuit determining a transmission rate of said input digital signal based on said count result; and a reset circuit supplying a reset signal to said change-point counter and said transmission rate identification circuit, wherein said reset circuit comprises:
an oscillator;
a first frequency divider dividing a frequency of an output of said oscillator for outputting a first reset signal; and
a second frequency divider dividing the frequency of the output of said oscillator for outputting a second reset signal, wherein said change-point counter comprises binary counters which are reset by said first reset signal, and wherein said transmission rate identification circuit comprises:
a comparator receiving an output of said change-point counter at a first input terminal, comparing magnitudes of signals applied to the first and second input terminals, and outputting a high-level signal when the magnitude of the signal applied to said first input terminal is larger;

an NAND gate outputting a logical product of the output of said comparator and said first reset signal;
a first latch circuit latching the output of said change-point counter on a falling edge of said logical product;
a second latch circuit supplying the signal latched by said first latch circuit to said second input terminal of said comparator on a rising edge of said frst clock signal; and
a third latch circuit latching the output of said second latch circuit on said second clock signal.

9. The transmission method comprising:

counting, for a predetermined time interval, a number of change points in code included in an input digital signal for outputting a count result; and identifying a transmission rate of said input digital signal based on said count result, wherein said input digital signal comprises an STM-N (N is a positive integer) signal and wherein said time interval is a value in a range from a time equivalent to three bytes of STM-4 to a time equivalent to N×10 bytes.

* * * * *